(12) United States Patent
Henry et al.

(10) Patent No.: US 8,639,919 B2
(45) Date of Patent: Jan. 28, 2014

(54) TRACER CONFIGURATION AND ENABLEMENT BY RESET MICROCODE

(75) Inventors: G. Glenn Henry, Austin, TX (US); Jason Chen, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 281 days.

(21) Appl. No.: 13/293,268

(22) Filed: Nov. 10, 2011

(65) Prior Publication Data
US 2012/0185681 A1     Jul. 19, 2012

Related U.S. Application Data

(60) Provisional application No. 61/433,904, filed on Jan. 18, 2011.

(51) Int. Cl.
| G06F 9/00 | (2006.01) |
| G06F 9/24 | (2006.01) |
| G06F 9/44 | (2006.01) |
| G06F 15/177 | (2006.01) |

(52) U.S. Cl.
USPC ............... 713/2; 713/1; 712/227; 717/124

(58) Field of Classification Search
USPC .............. 713/1, 2; 717/124; 712/227; 700/76
See application file for complete search history.

(56) References Cited

U.S. PATENT DOCUMENTS

| 5,630,049 A | * | 5/1997 | Cardoza et al. .................. 714/25 |
| 5,850,562 A | * | 12/1998 | Crump et al. ...................... 713/1 |
| 6,438,709 B2 | | 8/2002 | Poisner |
| 6,457,073 B2 | | 9/2002 | Barry et al. |
| 6,463,529 B1 | | 10/2002 | Miller et al. |
| 6,643,796 B1 | | 11/2003 | Floyd et al. |
| 6,687,865 B1 | | 2/2004 | Dervisoglu et al. |
| 6,728,904 B2 | | 4/2004 | Kanekawa et al. |
| 7,013,398 B2 | | 3/2006 | Zhao |
| 7,111,160 B1 | * | 9/2006 | Henniger et al. .................. 713/2 |
| 7,590,891 B2 | * | 9/2009 | Ishihara .......................... 714/30 |
| 8,375,219 B2 | * | 2/2013 | Westerinen et al. ........... 713/187 |
| 2001/0042198 A1 | | 11/2001 | Poisner |
| 2002/0062480 A1 | | 5/2002 | Kirisawa |
| 2002/0073400 A1 | * | 6/2002 | Beuten et al. .................. 717/127 |
| 2002/0129309 A1 | | 9/2002 | Floyd et al. |
| 2003/0014264 A1 | | 1/2003 | Fuji et al. |
| 2003/0056154 A1 | | 3/2003 | Edwards et al. |

(Continued)

FOREIGN PATENT DOCUMENTS

| CN | 101000596 | 7/2007 |
| JP | 62256298 | 11/1987 |

*Primary Examiner* — Mark Connolly
(74) *Attorney, Agent, or Firm* — E. Alan Davis; James W. Huffman

(57) ABSTRACT

A microprocessor is provided with a reset logic flag and corresponding reset microcode that selectively enables the reset microcode to set up and enable debug logic before the microprocessor subsequently fetches and executes user instructions. When the reset logic flag is set to a debug mode, the reset microcode configures and enables the microprocessor's debug logic before the microprocessor subsequently fetches and executes user instructions. When the reset logic flag is set to a normal mode, the reset microcode refrains from configuring and enabling the microprocessor's debug logic. The reset logic flag is indicated by an alterable fuse or a debugger-programmable scan register. Debug configuration initialization values are also provided by several alternative structures, including the reset microcode itself, alterable fuses, and debugger-programmable scan registers. Corresponding methods are also provided for configuring the debug logic of a microprocessor.

22 Claims, 2 Drawing Sheets

(56) References Cited

U.S. PATENT DOCUMENTS

| | | |
|---|---|---|
| 2004/0221196 A1 | 11/2004 | Datta et al. |
| 2005/0229160 A1* | 10/2005 | Rothman et al. ............ 717/124 |
| 2007/0180315 A1 | 8/2007 | Aizawa |
| 2007/0209072 A1 | 9/2007 | Chen |
| 2007/0214341 A1 | 9/2007 | Das |
| 2008/0016405 A1 | 1/2008 | Kitahara |
| 2008/0126877 A1 | 5/2008 | Alsup |
| 2008/0141073 A1* | 6/2008 | Shih et al. ...................... 714/36 |
| 2008/0184055 A1 | 7/2008 | Moyer et al. |
| 2009/0313507 A1 | 12/2009 | Swaine et al. |
| 2009/0313623 A1 | 12/2009 | Coskun et al. |
| 2010/0064173 A1 | 3/2010 | Pedersen et al. |
| 2011/0010530 A1 | 1/2011 | Henry et al. |
| 2011/0010531 A1 | 1/2011 | Henry et al. |
| 2011/0053649 A1 | 3/2011 | Wilson |
| 2011/0143809 A1 | 6/2011 | Salomone et al. |
| 2011/0185153 A1 | 7/2011 | Henry et al. |
| 2011/0185160 A1 | 7/2011 | Gaskins et al. |
| 2011/0202796 A1 | 8/2011 | Henry et al. |

\* cited by examiner

TRACER CONFIGURATION AND ENABLEMENT BY RESET MICROCODE

CROSS REFERENCE TO RELATED APPLICATION(S)

This application claims priority based on U.S. Provisional Application Ser. No. 61/433,904, filed Jan. 18, 2011, entitled TRACER CONFIGURATION AND ENABLEMENT BY RESET MICROCODE, which is hereby incorporated by reference in its entirety.

This application is related to the following co-pending U.S. Patent Applications, each of which is hereby incorporated by reference in its entirety.

| Ser. No. | Filing Date | Title |
|---|---|---|
| 12/748,753 (CNTR.2461) | Mar. 29, 2010 | MICROPROCESSOR WITH INTER-OPERABILITY BETWEEN SERVICE PROCESSOR AND MICROCODE-BASED DEBUGGER |
| 12/748,929 (CNTR.2508) | Mar. 29, 2010 | SIMULTANEOUS EXECUTION RESUMPTION OF MULTIPLE PROCESSOR CORES AFTER CORE STATE INFORMATION DUMP TO FACILITATE DEBUGGING VIA MULTI-CORE PROCESSOR SIMULATOR USING THE STATE INFORMATION |
| 12/748,846 (CNTR.2510) | Mar. 29, 2010 | DEBUGGABLE MICROPROCESSOR |
| 12/944,269 (CNTR.2509) | Nov. 11, 2010 | MICROPROCESSOR WITH SYSTEM-ROBUST SELF-RESET CAPABILITY |

FIELD OF THE INVENTION

The present invention relates to the field of microprocessor design, and more particularly, to configuring debug logic of a microprocessor.

BACKGROUND OF THE INVENTION

Modern microprocessors are extremely complex. This complexity implies a high probability for bugs in the microprocessor and/or software executed by the microprocessor, including system firmware, such as BIOS. Thus, there exists a need for tools to aid microprocessor developers in debugging the microprocessor and system firmware. Many debugging tools exist. Most bugs manifest themselves when executing user software, such as application software or operating system software. For example, the bug might manifest when the microprocessor is executing a particularly demanding application, such as a video game, or during a particularly heavy workload placed on it by many users and/or a unique combination of user software applications. In these situations, it suffices that the debugging tools are configured and enabled by user software after the microprocessor has booted itself and is running user programs. However, historically there is a class of bugs that manifest early on in the system boot process before user software runs to configure and enable the debugging tools. Thus, what is needed is an aid for debugging this class of bugs.

BRIEF SUMMARY OF INVENTION

In one aspect of the present invention, a microprocessor comprises debug logic, programmable debug configuration storage elements, a reset logic flag, and reset microcode. The microprocessor is configured to execute the reset microcode in response to being reset and prior to fetching and executing user program instructions. The reset logic flag, which is alterable prior to the microprocessor being reset, selectively enables the reset microcode to set up and enable the debug logic before the microprocessor subsequently fetches and executes user instructions.

The reset microcode is configured to determine whether the reset logic flag has a first predetermined value or a second predetermined value, corresponding respectively to a debug mode value and a default normal mode value. If the flag has the first predetermined value, corresponding to the debug mode, then the reset microcode writes debug configuration initialization values into the programmable debug configuration storage elements to configure the debug logic. It the flag has the second predetermined value, corresponding to the normal mode, then the reset microcode refrains from writing debug configuration initialization values into the programmable debug configuration storage elements. Accordingly, the microprocessor is conditionally configured, based upon the value of the flag, to set up and enable the debug logic during a subsequent reset of the microprocessor before subsequently fetching and executing user instructions.

In another aspect, the debug logic is tracer logic, the debug configuration storage elements are tracer configuration storage elements, and the debug configuration initialization values are tracer logic configuration values. In one embodiment, the programmable debug or tracer configuration storage elements comprise model specific registers of the microprocessor that are configurable both through the reset microcode described above and, separately, through a WRMSR instruction of an x86 instruction set architecture.

Yet another aspect relates to the structure of the reset logic flag. In one embodiment, the reset logic flag comprises an alterable fuse that is alterable by blowing the fuse via a high voltage input of the microprocessor. In another embodiment, the reset logic flag also or alternatively comprises a volatile memory scan register having a value that is settable by a debugger through a debug port of the microprocessor. In the latter embodiment, then the reset logic flag comprises the applicable scan register value, if any, previously provided by a debugger. The scan register's value is configured to persist when the microprocessor is reset, provided power is not removed from the microprocessor. If there is no applicable scan register value for the reset logic flag, then the reset logic flag value is the value indicated by the alterable fuse.

Similarly, another aspect relates to the source of the debug configuration initialization values conditionally applied by the reset microcode. The debug configuration initialization values are provided by one or more of a plurality of alternative debug configuration initialization storage elements. The debug configuration initialization values are, by default and in the absence of an applicable configured alternative source, values that are stored within the reset microcode itself. In some embodiments, microcode patch fuses, alterable by blowing the fuses via a high voltage input of the microprocessor, are provided for applying microcode patches to the microprocessor. In these embodiments, if an applicable microcode patch has been applied, then the debug configuration initialization values are values that are stored within the microcode patch. In some embodiments, volatile memory scan registers are alternatively or also provided for a debugger, operable to scan in and temporarily store values provided by the debugger through a debug port of the microprocessor. In these embodiments, then the debug configuration initialization values are the applicable scan register values, if any, previously provided by a debugger. If there are no such applicable scan register values, then the debug configuration initialization values are the values stored within an applicable microcode patch, if any. If neither of the two prior conditions apply, then the debug configuration initialization values are the values stored with the original reset microcode.

In another aspect, the debug logic conditionally invokes debug microcode based on values of the programmable debug configuration storage elements and detection of a debug-triggering event. The debug microcode configures the microprocessor, when in a debug mode, to generate a log of processor state information.

In another aspect of the present invention, a method is provided for configuring the debug logic of a microprocessor. The microprocessor executes, in response to a reset of itself, reset microcode. The reset microcode determines whether a flag has a first predetermined value or a second predetermined value, wherein the flag indicates whether the reset microcode is enabled to configure the debug logic. The reset microcode writes debug configuration initialization values into programmable debug configuration storage elements to configure the debug logic, if the flag has the first predetermined value. Otherwise, if the flag has the second predetermined value, then the reset microcode refrains from writing debug configuration initialization values into the programmable debug configuration storage elements.

Another aspect relates to the structure of the reset logic flag and actions to set it. In one embodiment, the reset logic flag comprises an alterable fuse that is alterable by blowing the fuse via a high voltage input of the microprocessor. In this embodiment, the method further comprises blowing the fuse via the high voltage input of the microprocessor.

In another embodiment, the reset logic flag also or alternatively comprises a volatile memory scan register having a value that is settable by a debugger through a debug port of the microprocessor. In this embodiment, the method further comprises connecting a debugger to the debug port of the microprocessor, using the debugger to set the scan register value, and resetting the microprocessor without removing power to the microprocessor.

Similarly, another aspect relates to alternative sources of the debug configuration initialization values and actions to set and apply them. In one embodiment, the action of writing values into programmable debug configuration storage elements comprises writing default values stored within the reset microcode into the programmable debug configuration storage elements. In other embodiments, the action of writing values into programmable debug configuration storage elements comprises writing debug configuration initialization values stored within a plurality of initialization storage elements into the programmable debug configuration storage elements. Where the initialization storage elements comprise alterable microcode patch fuses that are alterable by blowing the fuses via a high voltage input of the microprocessor, the method further comprises applying high voltages to one or more of the alterable microcode patch fuses to patch the reset microcode. Where the initialization storage elements comprise volatile memory scan registers having values that are settable through a debug port of the microprocessor, the method further comprises connecting a debugger to the debug port of the microprocessor, using the debugger to set the scan register values, and resetting the microprocessor without removing power to the microprocessor.

In yet another aspect of the present invention, a method is provided for configuring the debug logic of a microprocessor by setting a reset logic flag that selectively enables reset microcode to set up and enable debug logic in a microprocessor before subsequently fetching and executing user instructions. The method comprises connecting a debugger to the debug port of the microprocessor, running the microprocessor with its reset logic flag set to the default normal mode, using the debugger to set the reset logic flag to a debug mode value, resetting the microprocessor, and executing, in response to a reset of the microprocessor, the reset microcode. The reset microcode determines whether the reset logic flag has the normal mode value or the debug mode value, writes values into programmable debug configuration storage elements to configure the debug logic, if the reset logic flag has the debug mode value, and, if not, refrains from writing values into the programmable debug configuration storage elements.

Additional aspects of the method, as with the previously mentioned method, relate to the structure of the reset logic flag and actions to set it, and to alternative sources of the debug configuration initialization values and actions to set and apply them. In one embodiment, the method further comprises using a debugger to write new debug configuration values to a plurality of debug configuration initialization storage elements prior to resetting the microprocessor. In other embodiments, the method further comprises applying high voltages to one or more alterable microcode patch fuses to alter a corresponding value of the reset logic flag and/or to patch the reset microcode prior to resetting the microprocessor. In yet other embodiments, the method further comprises using a debugger to set scan register values, applicable to the reset logic flag and/or the debug configuration initialization values, prior to resetting the microprocessor.

DETAILED DESCRIPTION OF THE INVENTION

Figure 1:
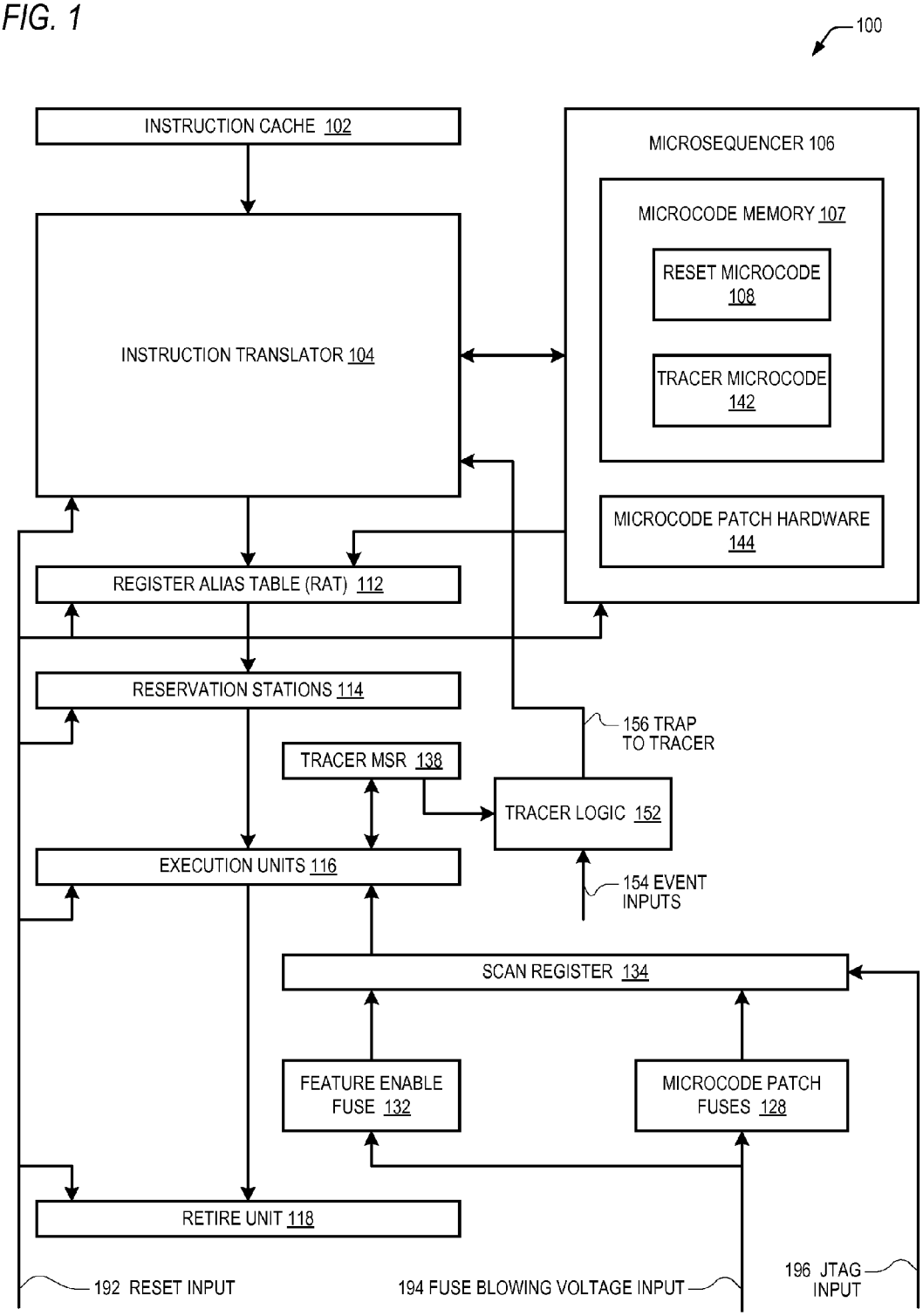
FIG. 1 is a block diagram illustrating one embodiment of a microprocessor according to the present invention.

U.S. patent application Ser. No. 12/748,753 (CNTR. 2461), Ser. No. 12/748,929 (CNTR. 2508), Ser. No. 12/944,269 (CNTR. 2509), and Ser. No. 12/748,846 (CNTR. 2510) describe a microprocessor debug and performance tuning feature referred to as "tracer." Generally speaking, tracer is a set of microcode routines that lie dormant until activated by a software write to a control register (e.g., WRMSR instruction).

Once activated, various events can trigger the tracer to gather processor state information and write it to specified addresses in memory so that it can be captured by a logic analyzer monitoring the external processor bus. The state information can include the contents of the register sets; translation-lookaside buffers; cache memories, such as data caches, instruction caches, branch target address caches, level-2 caches; a private RAM of the processor 102; and so forth. The state information and other information associated with it (e.g., time information) is referred to herein as log information, or simply a log.

The events can also trigger tracer to perform other actions, such as clearing various state (e.g., write-back invalidate caches, clear TLBs, LRU arrays, branch prediction information), or causing the processor to take an SMI interrupt to a private SMM address allocated for tracer. Event examples include: execution of a specified instruction; an x86 exception; SMI, INTR, NMI, STPCLK, A20 interrupts; VM exit condition; machine check; and read/write an APIC register.

The tracer can be configured, enabled, and triggered by a service processor. The log information can be written to system memory or to the service processor bus in case the main processor bus is hung. The service processor can also detect the main processor is hung and reset the main processor and/or write the log information for the main processor. The tracer can be configured on each core of a multi-core processor such that all cores simultaneously resume execution after a breakpoint. The tracer can be configured to repeatedly: trigger after a predetermined number of instructions have been retired, dump the processor state to memory, reset the processor, re-load the processor state from memory, and resume execution. The reset of the processor, if necessary, can be a partial reset in order to avoid hanging the system bus.

However, there are times when a bug, either in the microprocessor or in the system firmware, manifests itself before the user program gets to configure the tracer registers. A solution to this problem is described herein, namely to configure the microprocessor to cause reset microcode to load tracer configuration registers with default values before the microprocessor begins fetching and executing user instructions so that tracer can be triggered by events as soon as user code makes one of the events happen. Configuring the microprocessor to do this may include patching the tracer microcode in addition to blowing the fuse to turn on the feature. Patching the microcode enables the debugger to change the tracer configuration register values from the default values.

Referring now to FIG. 1, a block diagram illustrating a microprocessor 100 according to the present invention is shown. The microprocessor 100 may be selectively configured, preferably by altering a programmable fuse value, to cause reset microcode of the microprocessor 100 to configure and enable the tracer feature prior to the microprocessor 100 transferring control to a user program, such as system firmware, i.e., prior to fetching and executing user program instructions. This facilitates debugging both the microprocessor 100 and the system firmware. More specifically, it facilitates debugging the class of bugs that manifest themselves early on in the system boot process before user software is able to run to configure and enable tracer. Additionally, it enables the microprocessor 100 manufacturer to determine whether the bug is in the microprocessor 100 or in the system firmware in situations where the microprocessor 100 manufacturer does not have access to the system firmware source code.

According to one embodiment, the microprocessor 100 microarchitecture comprises a superscalar, out-of-order execution pipeline of functional units. An instruction cache 102 caches instructions fetched from a system memory (not shown). An instruction translator 104 is coupled to receive instructions, such as x86 instruction set architecture instructions, from the instruction cache 102. A register alias table (RAT) 112 is coupled to receive translated microinstructions from the instruction translator 104 and from a microsequencer 106 and to generate dependency information for the translated microinstructions. Reservation stations 114 are coupled to receive the translated microinstructions and dependency information from the RAT 112. Execution units 116 are coupled to receive the translated microinstructions from the reservation stations 114 and to receive instruction operands for the translated microinstructions. The operands may come from registers of the microprocessor 100, such as general purpose registers (not shown) and readable and writeable model-specific registers (MSR) 138, and from a data cache (not shown) coupled to the execution units 116. A retire unit 118 is coupled to receive instruction results from the execution units 116 and to retire the results to architectural state of the microprocessor 100. An external reset input 192 is coupled to each of the functional units. A reset value on the reset input 192 keeps the microprocessor 100 in a reset state when the microprocessor 100 is powered up until a transition occurs on the reset input 192 to its non-reset value.

The MSR 138 include tracer MSR 138, or configuration registers 138. The tracer configuration registers 138 store configuration values associated with tracer operation, such as information specifying events that will trigger tracer and actions that tracer will perform in response to the events, as discussed in detail in the above-referenced U.S. patent applications. As mentioned above, a user program may write to the tracer configuration registers 138 to configure and enable tracer. In one embodiment, the tracer configuration registers 138 may be written by user code via the x86 WRMSR instruction. Advantageously, as discussed herein, reset microcode 108 (discussed below) may be enabled to load tracer configuration values into the tracer configuration registers 138 and to enable tracer prior to fetching and executing user instructions in order to facilitate debugging of the microprocessor 100 and/or system firmware.

The microsequencer 106 includes a microcode memory 107 configured to store the reset microcode 108, tracer microcode 142 and other microcode instructions that are executed by the execution units 116. The microsequencer 106 also includes microcode patch hardware 144. The reset microcode 108 is invoked in response to a reset of the microprocessor 100. That is, when the microprocessor 100 is reset, the first instructions executed by the microprocessor 100 are the reset microcode 108 instructions. In one embodiment, the microcode 108/142 instructions are instructions of the micro-architectural instruction set of the microprocessor 100. In another embodiment, the microcode 108/142 instructions are instructions of a different instruction set, which get translated into instructions of the micro-architectural instruction set of the microprocessor 100. Operation of the reset microcode 108 and tracer microcode 142 is discussed in more detail below.

The microprocessor 100 also includes logic 152 that receives the tracer configuration registers 138 values and receives event inputs 154 and responsively generates a trap on tracer signal 156 to the instruction translator 104 to cause the instruction translator 104 to stop fetching user program instructions and to transfer control to the microsequencer 106 to begin fetching the tracer microcode 142. Thus, the tracer microcode 142 is invoked when an event occurs that has been specified in the tracer configuration registers 138 as a tracer trigger event. The event inputs 154 may include inputs to indicate events described in the above-referenced U.S. patent applications such as, but not limited to, a counter indicates that the microprocessor 100 has retired a predetermined number of instructions, the instruction translator 104 has decoded one of a predetermined set of instructions, or an exception was taken. The logic 152 compares the event inputs 154 against the tracer configuration values received from the tracer configuration registers 138 to determine whether the events 154 meet the conditions to trap to tracer 156. Advantageously, as described herein, the microprocessor 100 may be configured (via a feature enable fuse 132 or, discussed below, a debug or test access port such as a (Joint Test Action Group) JTAG input 196 that is part of a JTAG interface) to cause the reset microcode 108 to load tracer configuration values into the tracer configuration registers 138 to configure and enable tracer prior to fetching and executing user program instructions. Furthermore, default tracer configuration values may be modified by patching the microcode via microcode patch fuses, as described herein.

The microprocessor 100 also includes a feature enable fuse 132 that indicates whether a debugger (i.e., a person debugging the microprocessor 100 and/or firmware) has enabled the reset microcode 108 to configure and enable the tracer feature. The feature enable fuse 132 value is provided to the execution units 116 so that the reset microcode 108 can read the value. A blown value of the feature enable fuse 132 instructs the reset microcode 108 to configure and enable the tracer feature, whereas a non-blown value of the feature enable fuse 132 instructs the reset microcode 108 to refrain from configuring and enabling the tracer feature. The feature enable fuse 132 may be blown by applying a high voltage on a fuse-blowing input 194. In one embodiment, the microprocessor 100 includes many fuses which are addressable, and the input 194 also includes address signals by which the feature enable fuse 132 may be specified as the fuse to be blown.

The microprocessor 100 also includes microcode patch fuses 128 that that may be selectively blown with microcode patches that are written to the microcode patch hardware 144 to patch the microcode 108/142. In particular, default tracer configuration values manufactured into the microcode 108/142 may be patched via the microcode patch fuses 128. The microcode patch fuse 128 values are provided to the execution units 116 so that the reset microcode 108 can read the values and write them to the microcode patch hardware 144. The patch fuses 128 may be blown via the fuse blowing voltage input 194.

In one embodiment, the microprocessor 100 also includes a scan register 134 interposed between the execution units 116 on the one hand and the feature enable fuse 132 and microcode patch fuses 128 on the other hand. The scan register 134 receives the feature enable fuse 132 value and the microcode patch fuse 128 values provides them to the execution units 116 as they execute instructions that request the values. However, if the debugger scans values into the scan register 134 via the JTAG input 196 prior to the microprocessor 100 coming out of reset, the scan register 134 provides the alternate scanned-in value of the feature enable fuse 132 and/or the microcode patch fuses 128 to the execution units 116. In this manner the debugger may enable the feature to cause the reset microcode 108 to configure and enable tracer before fetching and executing user instructions without having to blow the feature enable fuse 132. Similarly, in this manner the debugger may modify the default tracer configuration values by patching them in the microcode 108/142 without having to blow the microcode patch fuses 128. An advantage of scanning values into the scan register 134 via the JTAG input 196 rather than blowing fuses 128/132 is that, unlike blowing the fuses 128/132, the values may be subsequently changed. The scanned-in values persist even when the microprocessor 100 is reset 192; however, when power is removed from the microprocessor 100, the scanned-in values are lost.

In one embodiment, the debugger scans values into the scan register 134 after the microprocessor 100 is powered up but before the reset input is released, i.e., before the reset microcode 108 begins to run. The debugger may employ a debugger adapter such as a JTAG card to scan in the value to alter the value of the fuses 128/132 via the JTAG input 196. The JTAG card is typically installed in (or coupled to via a USB port, for example) a computer external to the computer that includes the microprocessor 100 and/or system firmware to be debugged. The JTAG card includes a JTAG interface for coupling to the JTAG input of the microprocessor 100 being debugged. The debugger sets the feature enable fuse 132 to a first predetermined value, either via the fuse-blowing input 194 or the JTAG input 196, to enable the feature and sets the feature enable fuse 132 to a second predetermined value to disable the feature.

Figure 2:
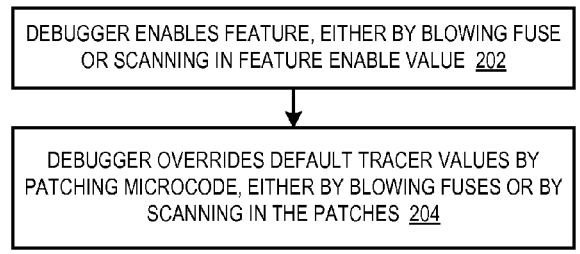
FIG. 2 is a flowchart illustrating one embodiment of a method for configuring the microprocessor of FIG. 1.

Referring now to FIG. 2, a flowchart illustrating a method for configuring the microprocessor 100 of FIG. 1 for debugging the microprocessor 100 of FIG. 1 and/or system firmware is shown. Flow begins at block 202.

At block 202, the debugger enables the debug feature by either blowing the feature enable fuse 132 via the fuse blowing voltage input 194 or by scanning in the feature enable value into the scan register 134 via the JTAG input 196 of FIG. 1. Flow proceeds to block 204.

At block 204, the debugger overrides the default tracer configuration values manufactured into the microcode 108/142 by patching the microcode 108/142, either by blowing the microcode patch fuses 128 via the fuse blowing voltage input 194 or by scanning the patch values into the scan register 134 via the JTAG input 196. In one embodiment, the default tracer configuration values cause tracer to generate a checkpoint upon: the instruction translator 104 encountering relevant instructions such as RDMSR, WRMSR, CPUID, IN, OUT, or RDTSC; an external interrupt, including a system management interrupt (SMI); an exception; or a TR7 event. The TR7 may be programmed with a value to specify a predetermined number of instructions to be retired before taking a checkpoint. On a TR7 event, the checkpoint comprises a full dump, or log, of processor state information each time a predetermined number of instructions are retired (e.g., 64K instructions), and on other tracer events the checkpoint comprises a smaller log, primarily including registers pertinent to the particular instruction or event encountered. Flow ends at block 204.

It is noted that it is undesirable to have the reset microcode enable tracer except in debugging environments because normal functionality and/or performance may be affected by the enablement of the tracer feature. That is, it would not be beneficial for the microprocessor 100 manufacturer to configure microprocessors 100 being shipped to customers for typical usage to enable the tracer feature at reset because they might experience impaired functionality and/or performance.

Figure 3:
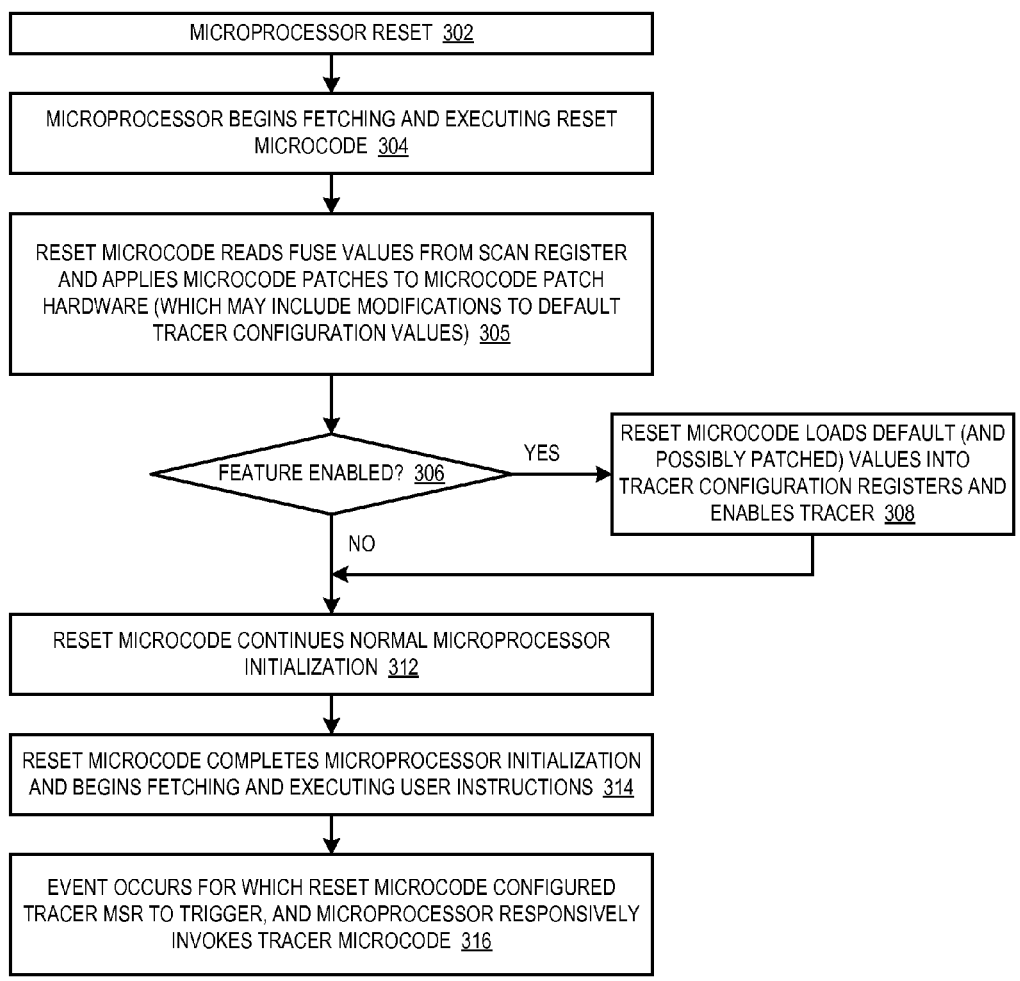
FIG. 3 is a flowchart illustrating operation of the microprocessor of FIG. 1.

Referring now to FIG. 3, a flowchart illustrating operation of the microprocessor 100 of FIG. 1 is shown. Flow begins at block 302.

At block 302, the microprocessor 100 comes out of reset. In one embodiment, the reset is caused by a transition on the reset pin 192 from a first predetermined value to a second predetermined value. In one embodiment, the reset may additionally be caused by the reception of a message, such as the well-known Pentium 4® bus protocol INIT message sent to the microprocessor 100 by a chipset of the system that includes the microprocessor 100. In another embodiment, the microprocessor 100 includes an auxiliary processor, or service processor, such as described in the above-referenced U.S. patent applications, and the service processor resets the main microprocessor 100 shown in FIG. 1. Flow proceeds to block 304.

At block 304, in response to the reset at block 302, the microprocessor 100 begins fetching and executing the microcode 108 of FIG. 1. In particular, the microsequencer 106 begins fetching and executing the reset microcode 108. Flow proceeds to block 305.

At block 305, the reset microcode 108 reads the values of the feature enable fuse 132 and microcode patch fuses 128 from the scan register 134. Additionally, the reset microcode 108 applies the microcode patches read from the scan register 134 by writing them to the microcode patch hardware 144. As mentioned above, the microcode patches may include modifications to default tracer configuration values in the microcode 108/142. Flow proceeds to decision block 306.

At decision block 306, the reset microcode 108 examines the value of the feature enable fuse 132 read at block 305 to determine whether the feature is enabled. In one embodiment, the microprocessor 100 includes a different feature enable fuse for each type of possible reset the microprocessor 100 may experience. For example, a first feature enable fuse may indicate whether the reset microcode 108 should configure and enable tracer in response to an external reset 192, a second feature enable fuse may indicate whether the reset microcode 108 should configure and enable tracer in response to an INIT message reset, and a third feature enable fuse may indicate whether the reset microcode 108 should configure and enable tracer in response to a reset of the microprocessor 100 by the service processor. If the feature is enabled, flow proceeds to block 308; otherwise, flow proceeds to block 312.

At block 308, the reset microcode 108 loads the default values into the tracer configuration registers 138 and enables tracer. The default values are included in the reset microcode 108 itself, i.e., the microcode memory 107 is manufactured with the default values. However, the default values included in the reset microcode 108 may be changed by blowing the microcode patch fuses 128 of FIG. 1. Flow proceeds to block 312.

At block 312, the reset microcode 108 continues its normal initialization of the microprocessor 100, such as performing diagnostic functions (e.g., testing cache memory arrays) and configuring other portions of the microprocessor 100. Flow proceeds to block 314.

At block 314, the reset microcode 108 completes initialization of the microprocessor 100 and transfers control to user software by fetching and executing instructions at the architectural reset vector address, at which system firmware typically resides. Flow proceeds to block 316.

At block 316, an event occurs for which the reset microcode 108 configured the tracer configuration registers 138 to trigger, and the microprocessor 100 responsively traps to the tracer microcode 142. Flow ends at block 316.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   debug logic;
   programmable debug configuration storage elements whose values configure the debug logic;
   a flag, alterable prior to the microprocessor being reset; and
   reset microcode, which the microprocessor is configured to execute in response to being reset and prior to fetching and executing user program instructions, the reset microcode being configured to:
      determine whether the flag has a first predetermined value or a second predetermined value;
      write values into the programmable debug configuration storage elements to configure the debug logic, if the flag has the first predetermined value; and
      refrain from writing values into the programmable debug configuration storage elements, if the flag has the second predetermined value;
   wherein the microprocessor is conditionally configured, based upon the value of the flag, to set up and enable the debug logic during a subsequent reset of the microprocessor before subsequently fetching and executing user instructions; and
   wherein the debug logic is configured to conditionally invoke debug microcode based on the values of the programmable debug configuration storage elements and detection of a debug-triggering event.

2. The microprocessor of claim 1, wherein the reset microcode is configured to write default values stored within the reset microcode into the programmable debug configuration storage elements.

3. The microprocessor of claim 1, further comprising a plurality of initialization storage elements that store debug configuration initialization values, wherein the reset microcode is configured to write the debug configuration initialization values into the programmable debug configuration storage elements if the flag has the first predetermined value.

4. The microprocessor of claim 3, wherein the initialization storage elements comprise alterable microcode patch fuses that are alterable by blowing the fuses via a high voltage input of the microprocessor.

5. The microprocessor of claim 3, further comprising a debug port, wherein the initialization storage elements comprise volatile memory scan registers having values that are settable through the debug port of the microprocessor, wherein the scan registers' values are configured to persist when the microprocessor is reset, provided that power is not removed from the microprocessor.

6. The microprocessor of claim 1, wherein the flag comprises an alterable fuse that is alterable by blowing the fuse via a high voltage input of the microprocessor.

7. The microprocessor of claim 1, further comprising a debug port, wherein the flag comprises a volatile memory scan register having a value that is settable through the debug port of the microprocessor, wherein the scan register value is configured to persist when the microprocessor is reset, provided that power is not removed from the microprocessor.

8. The microprocessor of claim 1, wherein the programmable debug configuration storage elements comprise model specific registers of the microprocessor that are configurable through a WRMSR instruction of an x86 instruction set architecture.

9. The microprocessor of claim 1, wherein the debug microcode configures the microprocessor, when in a debug mode, to generate a log of processor state information.

10. A method of configuring debug logic in a microprocessor, the method comprising:
   executing, in response to a reset of the microprocessor, reset microcode;
   the reset microcode determining whether a flag has a first predetermined value or a second predetermined value, wherein the flag indicates whether the reset microcode is enabled to configure the debug logic;
   the reset microcode writing values into programmable debug configuration storage elements to configure the debug logic, if the flag has the first predetermined value;
   the reset microcode refraining from writing values into the programmable debug configuration storage elements, if the flag has the second predetermined value; and
   conditionally invoking debug microcode based on the values of the programmable debug configuration storage elements and detection of a debug-triggering event.

11. The method of claim 10, wherein writing values into programmable debug configuration storage elements comprises writing default values stored within the reset microcode into the programmable debug configuration storage elements.

12. The method of claim 10, wherein writing values into programmable debug configuration storage elements comprises writing debug configuration initialization values stored within a plurality of initialization storage elements into the programmable debug configuration storage elements.

13. The method of claim 12, wherein the initialization storage elements comprise alterable microcode patch fuses that are alterable by blowing the fuses via a high voltage input of the microprocessor, the method further comprising applying high voltages to one or more of the alterable microcode patch fuses to patch the reset microcode.

14. The method of claim 12, wherein the initialization storage elements comprise volatile memory scan registers having values that are settable through a debug port of the microprocessor, wherein the scan registers' values are configured to persist when the microprocessor is reset, provided that power is not removed from the microprocessor, the method further comprising:
   connecting a debugger to the debug port of the microprocessor;
   using the debugger to set the scan register values; and
   resetting the microprocessor without removing power to the microprocessor.

15. The method of claim 10, wherein the flag comprises an alterable fuse that is alterable by blowing the fuse via a high voltage input of the microprocessor, the method further comprising:
   blowing the fuse via the high voltage input of the microprocessor.

16. The method of claim 10, wherein the flag comprises a volatile memory scan register having a value that is settable through a debug port of the microprocessor, wherein the scan register value is configured to persist when the microprocessor is reset, provided that power is not removed from the microprocessor, the method further comprising:
   connecting a debugger to the debug port of the microprocessor;
   using the debugger to set the scan register value; and
   resetting the microprocessor without removing power to the microprocessor.

17. A method of configuring debug logic in a microprocessor that includes a reset logic flag indicating either a default normal mode value or a debug mode value, the method comprising:
   connecting a debugger to a debug port of the microprocessor;
   running the microprocessor with its reset logic flag set to the default normal mode;
   using the debugger to set the reset logic flag to a debug mode value;
   resetting the microprocessor;
   executing, in response to a reset of the microprocessor, reset microcode;
   the reset microcode determining whether the reset logic flag has the normal mode value or the debug mode value;
   the reset microcode writing values into programmable debug configuration storage elements to configure the debug logic, if the reset logic flag has the debug mode value;
   the reset microcode refraining from writing values into the programmable debug configuration storage elements, if the reset logic flag has the normal mode value; and
   conditionally invoking debug microcode based on the values of the programmable debug configuration storage elements and detection of a debug-triggering event.

18. The method of claim 17, wherein the microprocessor further comprises a plurality of debug configuration initialization storage elements, the method further comprising:
   using the debugger to write new debug configuration values to the initialization storage elements prior to resetting the microprocessor;
   wherein the reset microcode's writing of values into programmable debug configuration storage elements comprises writing values stored in the initialization storage elements to the programmable debug configuration storage elements.

19. The method of claim 17, wherein the microprocessor further comprises a plurality of alterable microcode patch fuses that are alterable by blowing the fuses via a high voltage input of the microprocessor, the method further comprising:
   applying high voltages to one or more of the alterable microcode patch fuses to patch the reset microcode;
   wherein the reset microcode's writing of values into programmable debug configuration storage elements comprises writing values stored in the alterable microcode patch fuses to the programmable debug configuration storage elements.

20. The method of claim 17, wherein the microprocessor further comprises volatile memory scan registers having values that are settable through a debug port of the microprocessor, wherein the scan registers' values are configured to persist when the microprocessor is reset, provided that power is not removed from the microprocessor, the method further comprising:
   using the debugger to set the scan register values prior to resetting the microprocessor;
   wherein the resetting of the microprocessor is done without removing power to the microprocessor; and
   wherein the reset microcode's writing of values into programmable debug configuration storage elements comprises writing the scan register values to the programmable debug configuration storage elements.

21. The method of claim 17, wherein the reset logic flag comprises an alterable fuse that is alterable by blowing the fuse via a high voltage input of the microprocessor, the method further comprising:

blowing the alterable fuse via the high voltage input of the microprocessor in order to set the reset logic flag to the debug mode value.

22. The method of claim 17, wherein the reset logic flag comprises a volatile memory scan register having a value that is settable through a debug port of the microprocessor, wherein the scan register value is configured to persist when the microprocessor is reset, provided that power is not removed from the microprocessor, the method further comprising:

using the debugger to set the scan register value to the debug mode value prior to resetting the microprocessor;

wherein the resetting of the microprocessor is done without removing power to the microprocessor.

* * * * *